United States Patent
Sung et al.

(10) Patent No.: US 8,094,570 B2
(45) Date of Patent: Jan. 10, 2012

(54) METHOD OF TRANSMITTING DATA SUPPORTING MULTIPLE ACCESS

(75) Inventors: Dan Keun Sung, Seoul (KR); Bang Chul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 12/446,440

(22) PCT Filed: Oct. 25, 2007

(86) PCT No.: PCT/KR2007/005269
§ 371 (c)(1),
(2), (4) Date: Apr. 20, 2009

(87) PCT Pub. No.: WO2008/051025
PCT Pub. Date: May 2, 2008

(65) Prior Publication Data
US 2010/0322080 A1    Dec. 23, 2010

(30) Foreign Application Priority Data
Oct. 25, 2006    (KR) .................... 10-2006-0103948

(51) Int. Cl.
*H04L 1/00* (2006.01)
(52) U.S. Cl. ................ 370/242; 370/208; 370/342
(58) Field of Classification Search ............ 370/242, 370/208, 342
See application file for complete search history.

(56) References Cited

U.S. PATENT DOCUMENTS

| | | | |
|---|---|---|---|
| 6,542,478 B1 * | 4/2003 | Park .................... | 370/308 |
| 2001/0055293 A1 * | 12/2001 | Parsa et al. ............. | 370/342 |
| 2002/0191569 A1 * | 12/2002 | Sung et al. ............. | 370/335 |
| 2005/0073985 A1 | 4/2005 | Heo et al. | |
| 2006/0172716 A1 * | 8/2006 | Yoshii et al. ........... | 455/226.1 |

FOREIGN PATENT DOCUMENTS
EP    1475987    11/2004
* cited by examiner

*Primary Examiner* — Luat Phung
(74) *Attorney, Agent, or Firm* — Lee, Hong, Degerman, Kang & Waimey

(57) ABSTRACT

There is provided a method in which a second communication station located within a cell region provided by a first communication station transmits data. The method includes generating a hopping pattern between a plurality of orthogonal resources by arranging the plurality of orthogonal resources according to time, generating a transmission signal by mapping a data symbol to orthogonal resources, which are included in the hopping pattern and allocated to a specific timeslot and transmitting the transmission signal to the first communication station. Capacity for supporting multiple access can be increased by effectively utilizing limited wireless communication resources.

6 Claims, 10 Drawing Sheets

[Fig. 1]
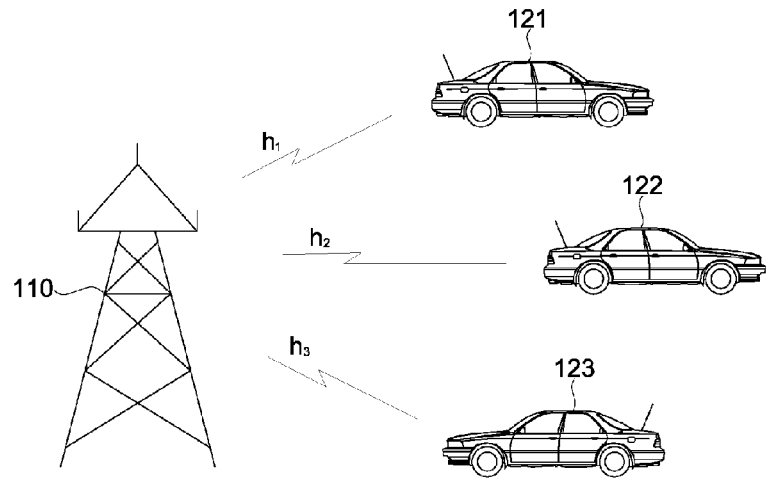
[Fig. 2]
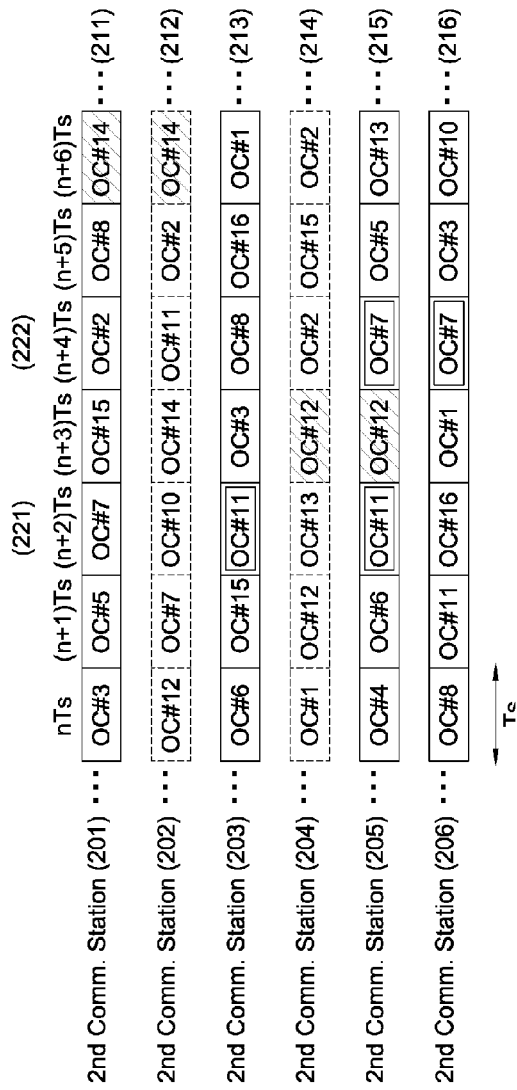

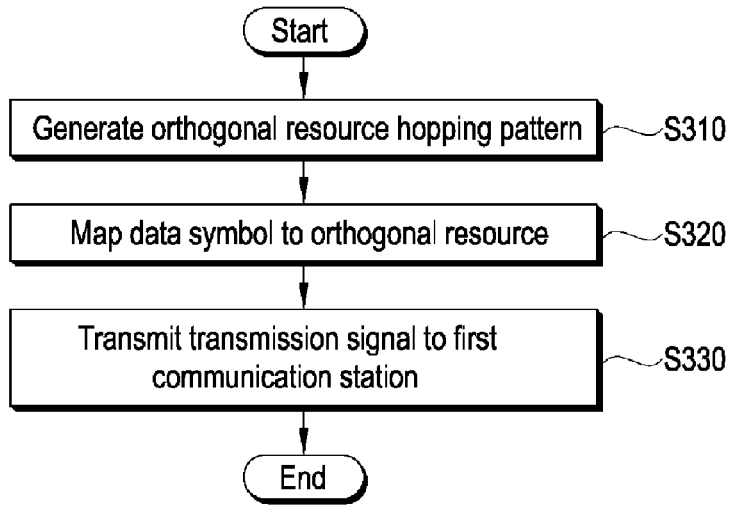
[Fig. 3]
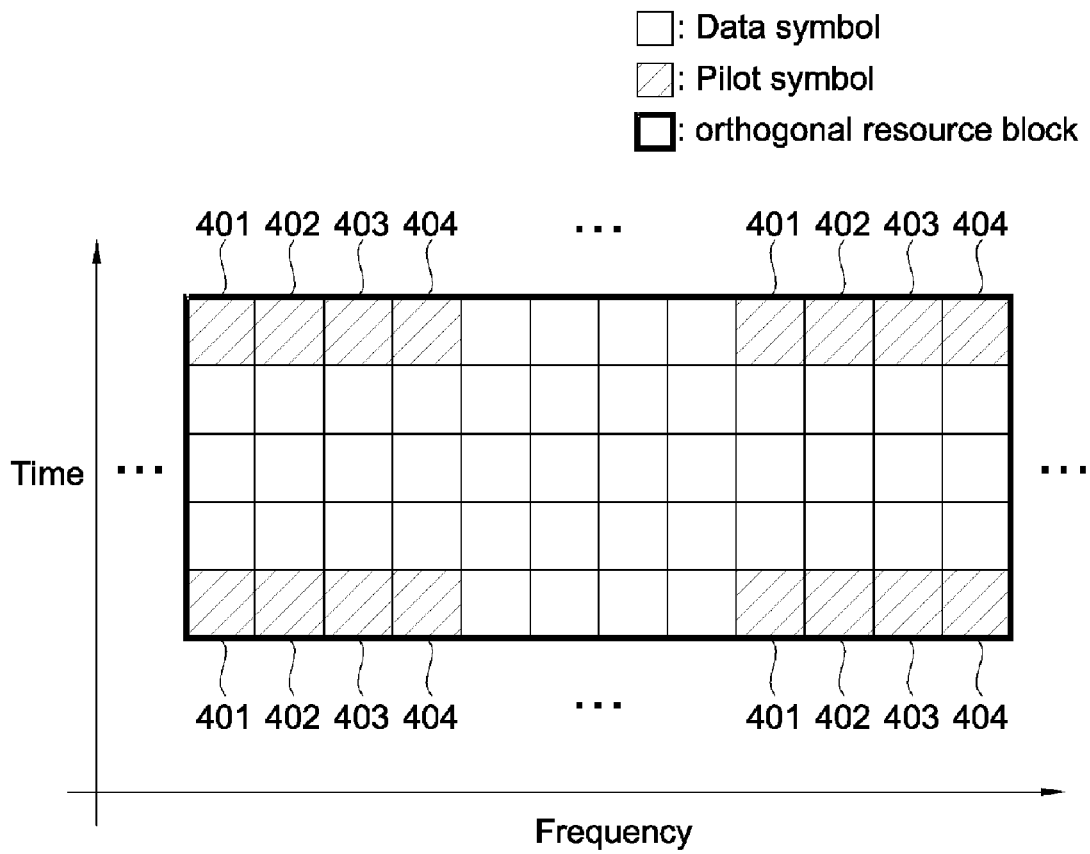
[Fig. 4]

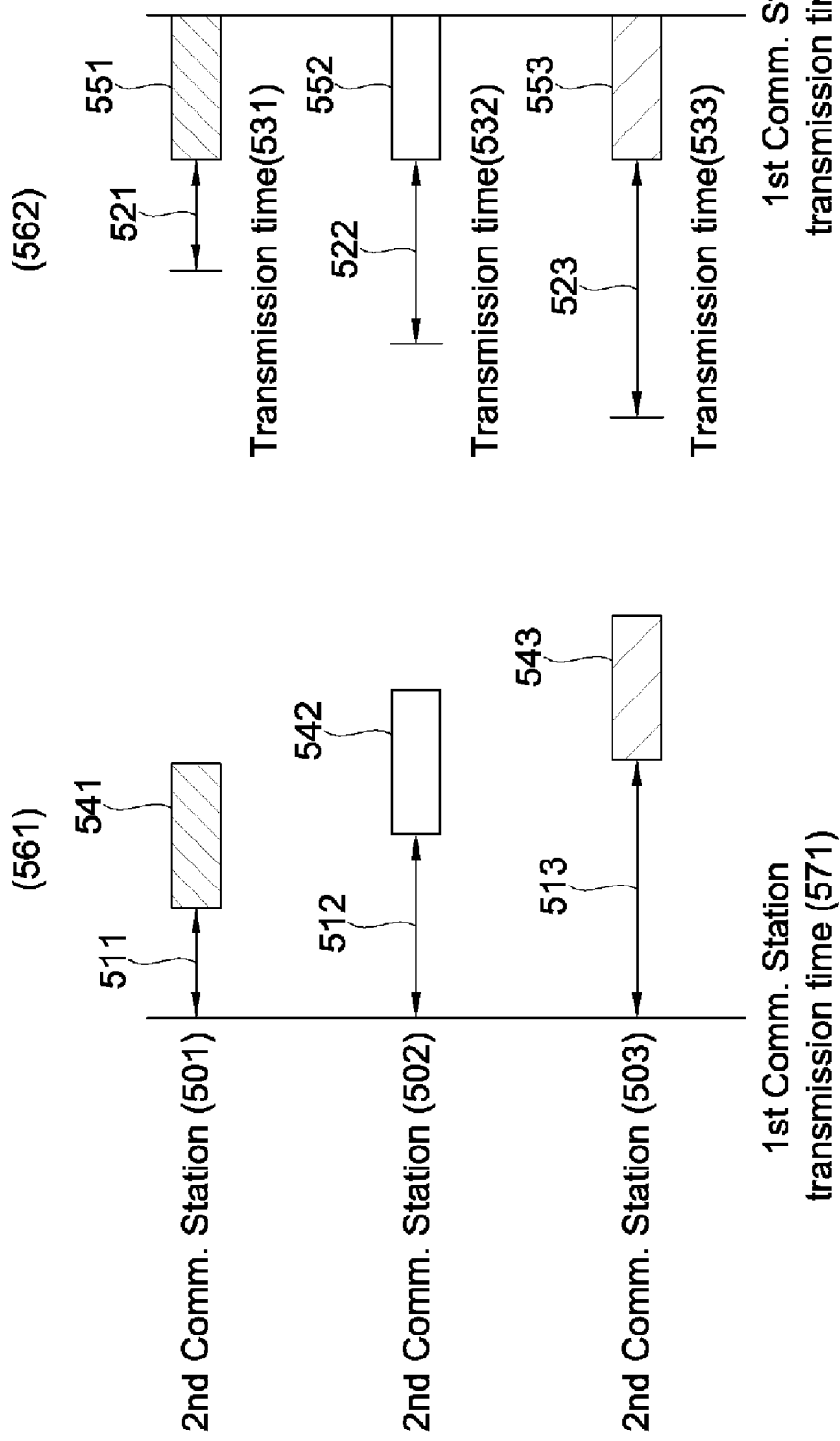
[Fig. 5]

[Fig. 6]
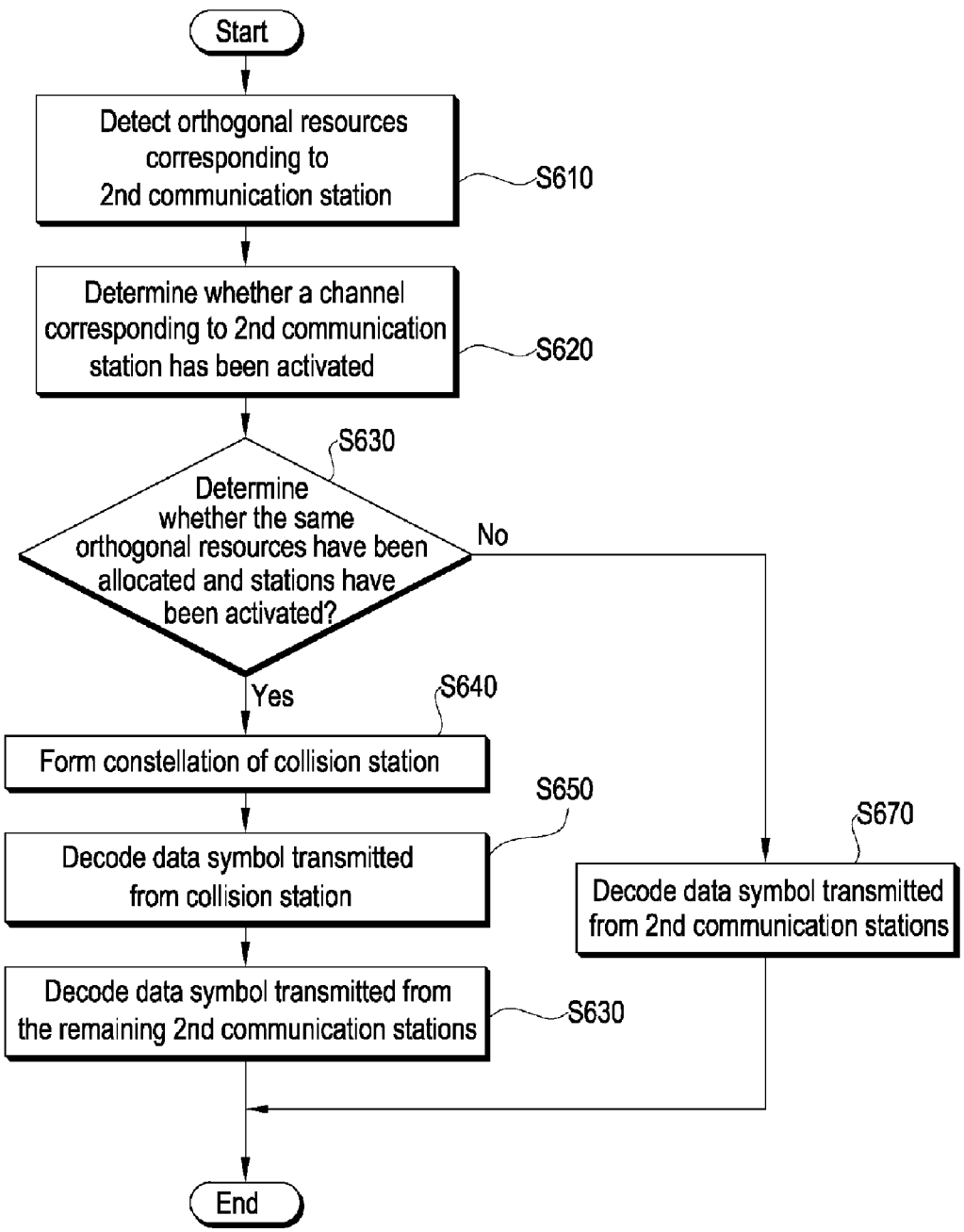
[Fig. 7]
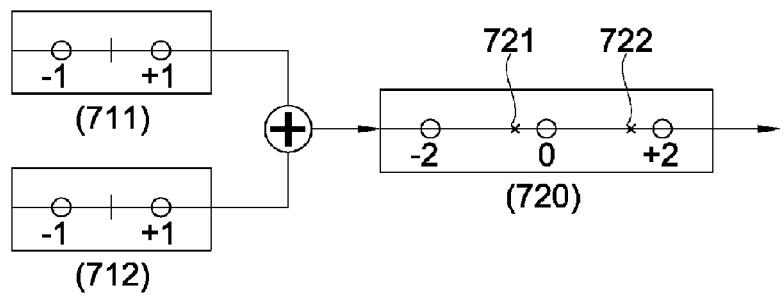

[Fig. 8]
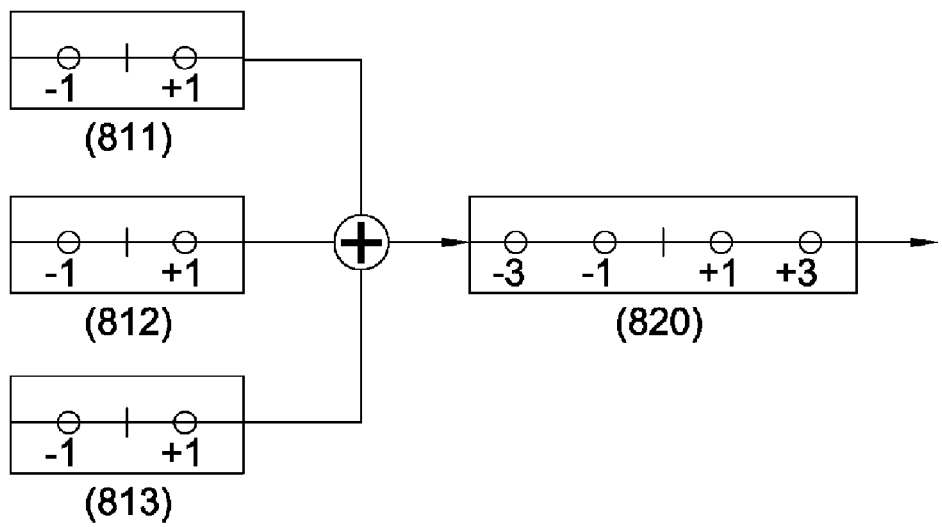
[Fig. 9]
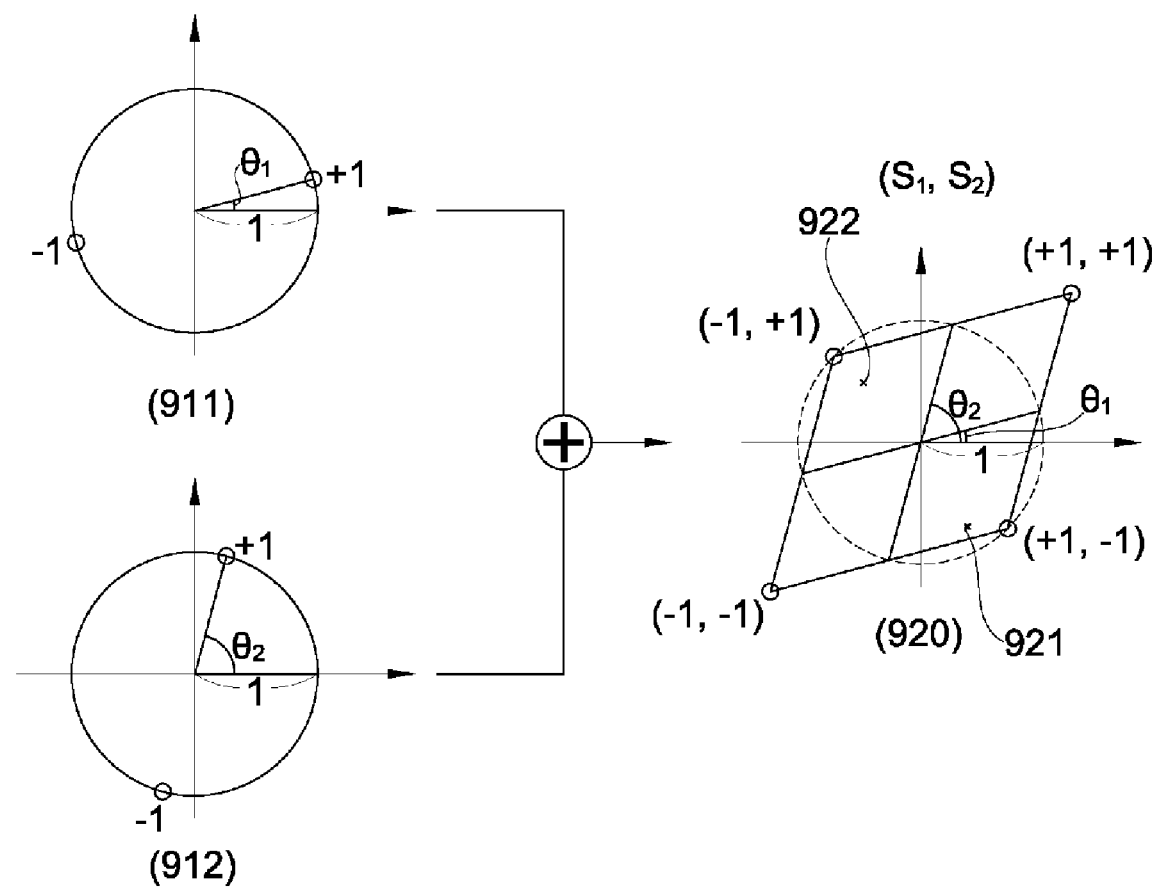

[Fig. 10]
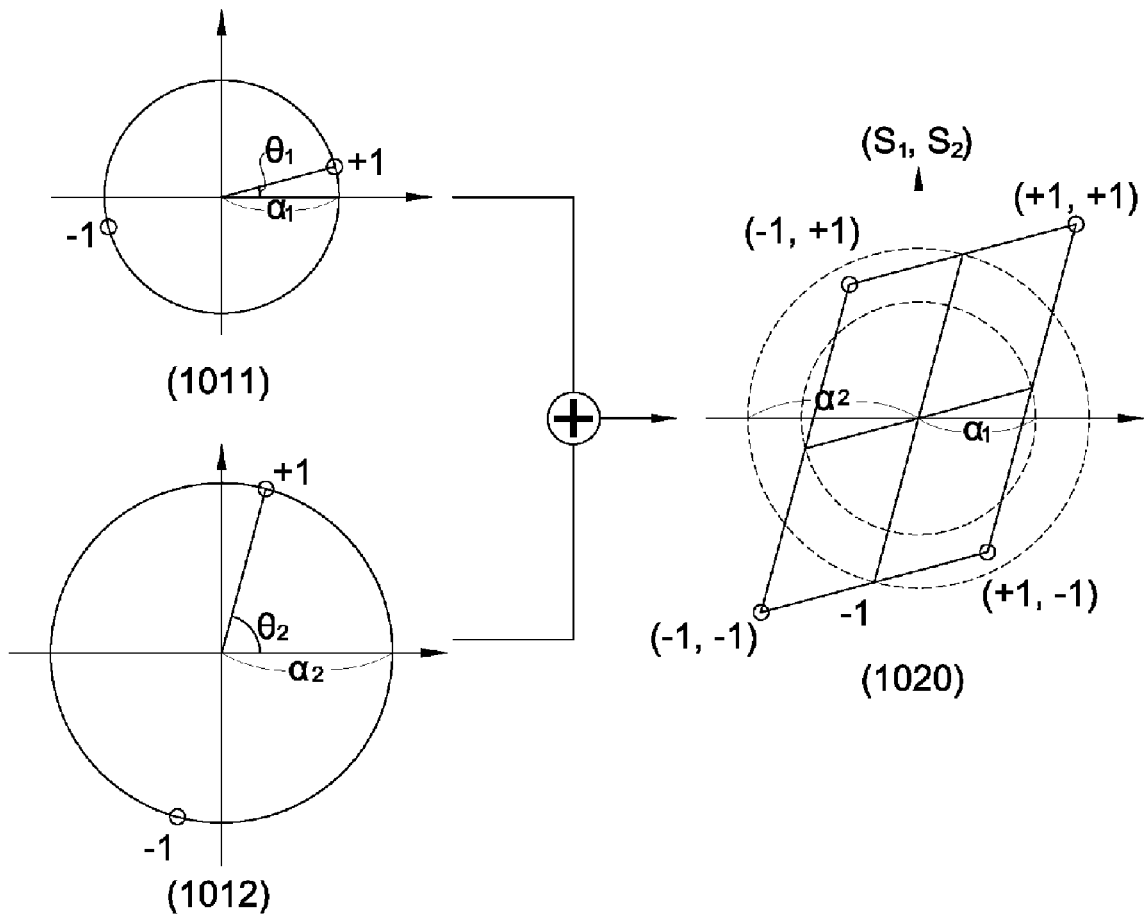
[Fig. 11]
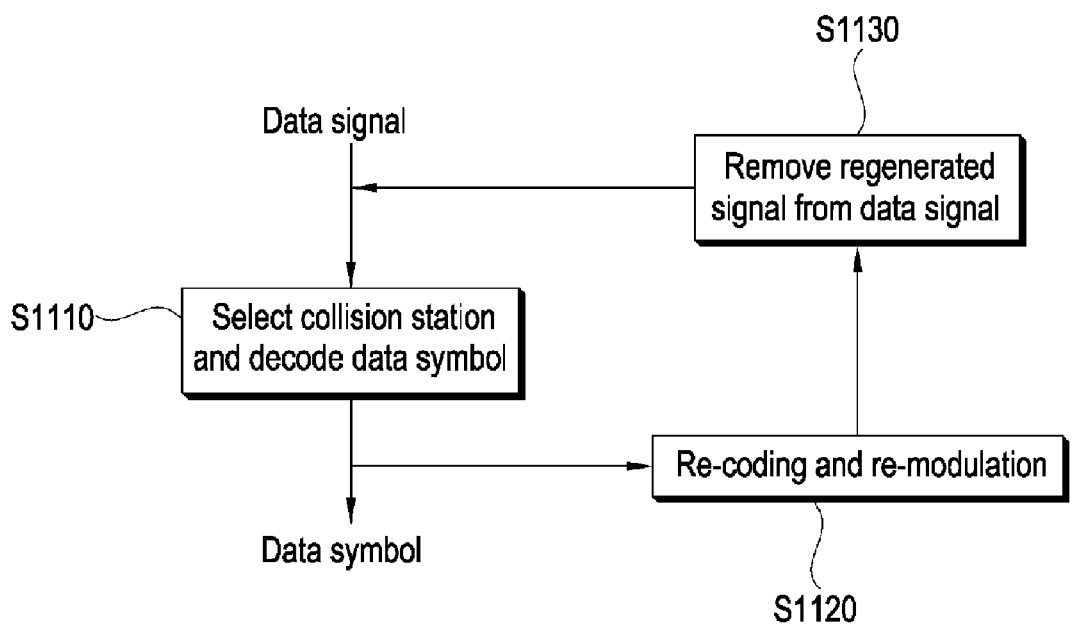

[Fig. 12]
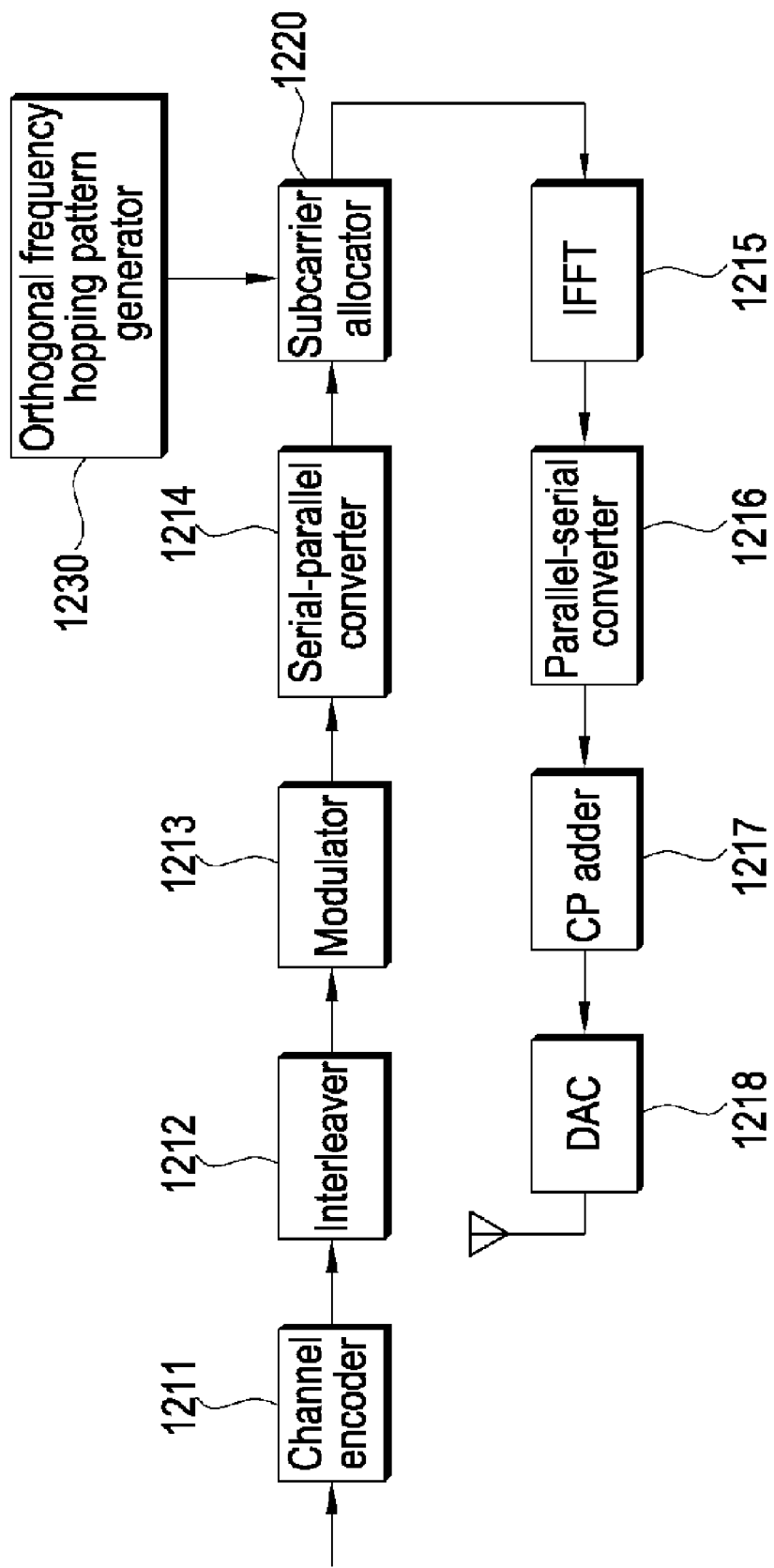

[Fig. 13]
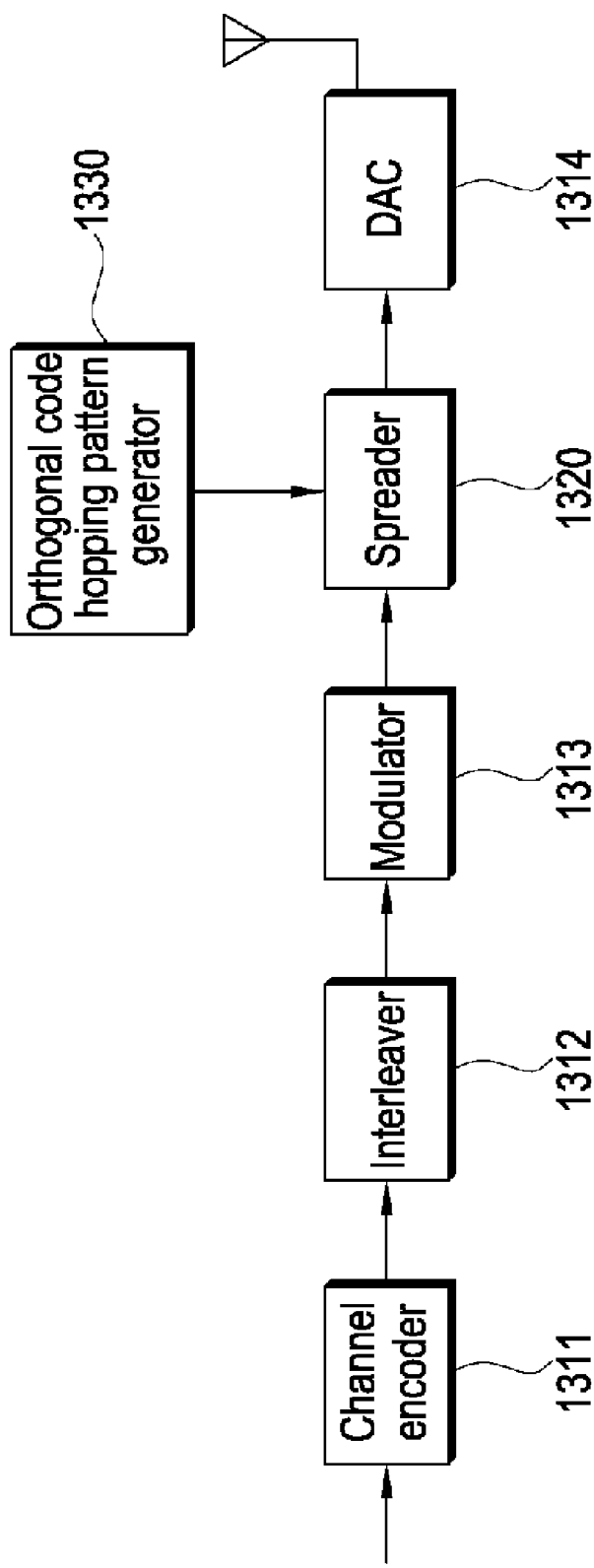

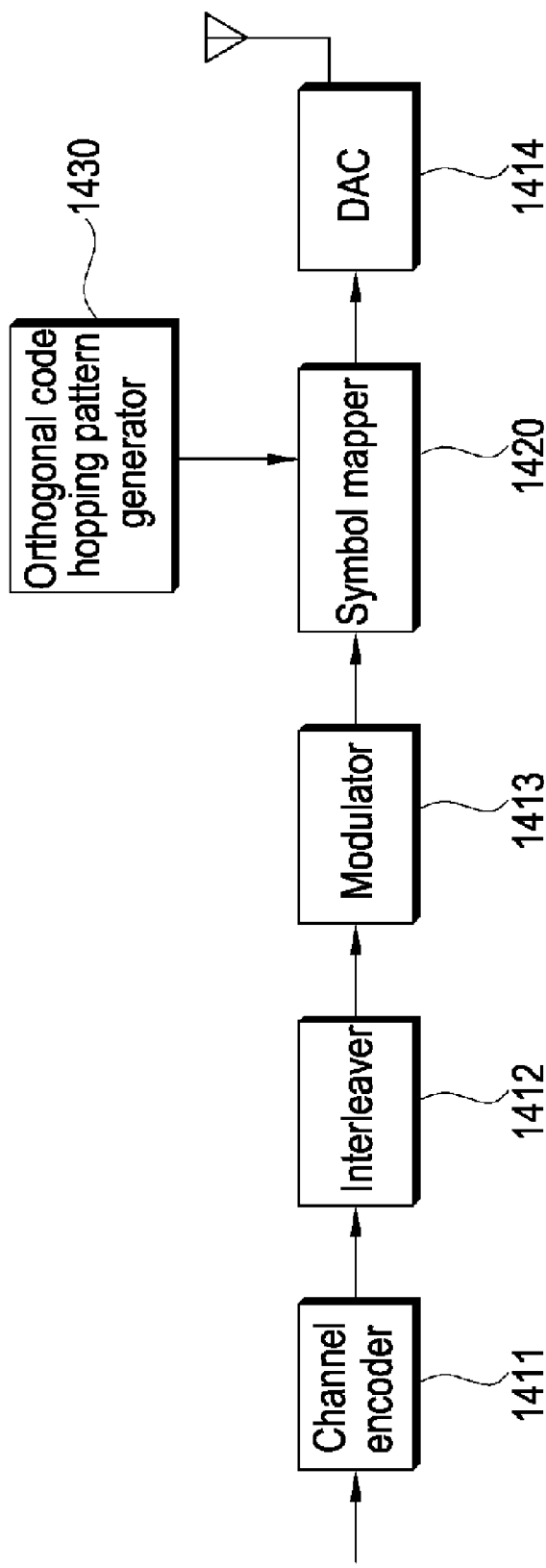
[Fig. 14]

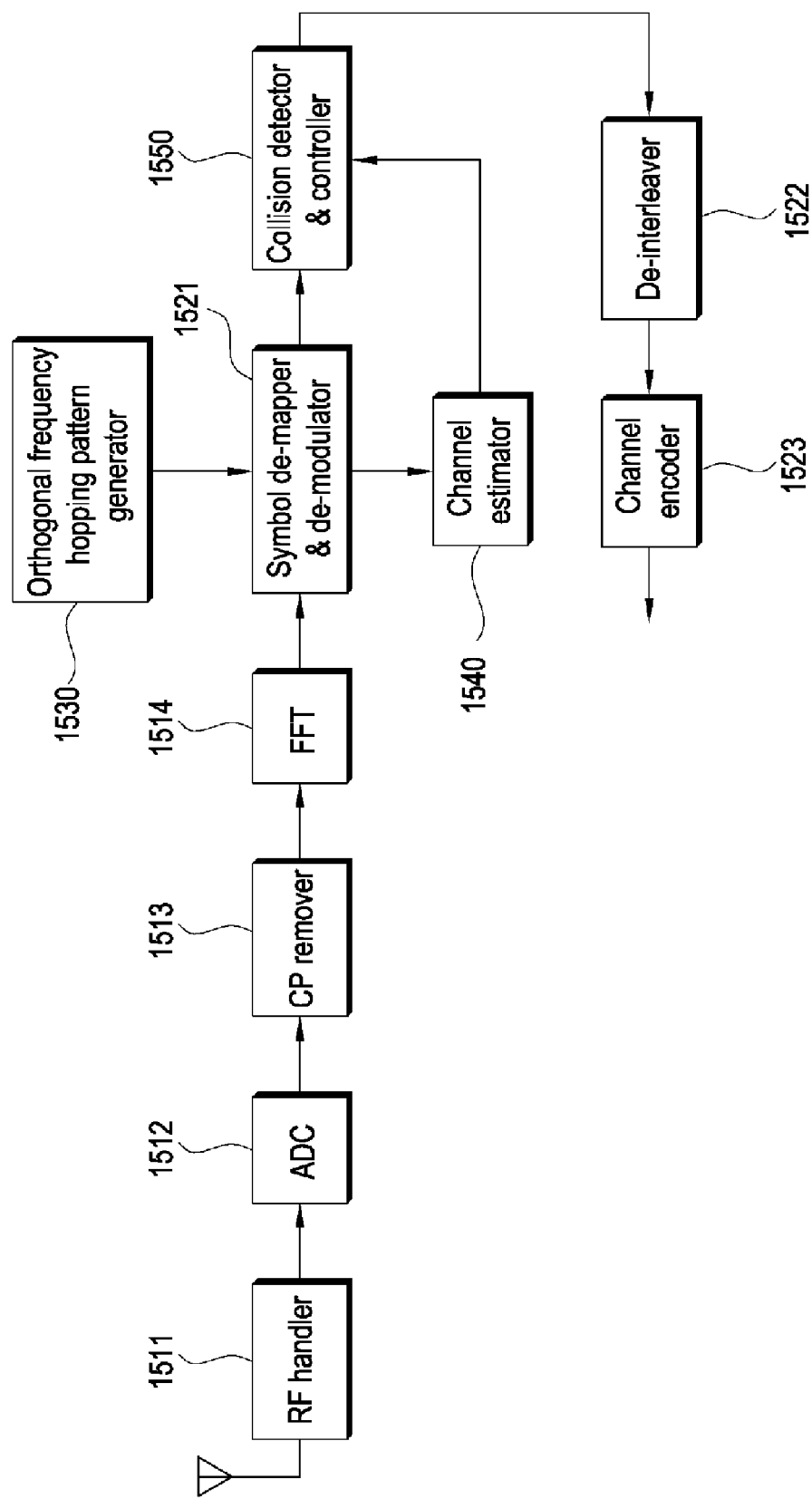
[Fig. 15]

METHOD OF TRANSMITTING DATA SUPPORTING MULTIPLE ACCESS

CROSS-REFERENCE TO RELATED APPLICATIONS

This application is a 371 U.S. national stage application of International Application No. PCT/KR2007/005269, filed Oct. 25, 2007, which claims the benefit of earlier filing date and right of priority to Korean Patent Application No. 10-2006-0103948, filed Oct. 25, 2006, the contents of which are incorporated by reference herein in their entirety.

TECHNICAL FIELD

The present invention relates to wireless communication, and more particularly, to a method of transmitting data through hopping between orthogonal resources.

BACKGROUND ART

In a wireless communication system, user capacity has been generally limited by signal interference between users within a cell. In recent years, as a solution for overcoming this intra-cell interference problem, a method using an orthogonal code has been proposed.

A method employing an orthogonal code refers to a method in which each user within a cell codes his data using different code resources having orthogonality and transmits the data to a base station, thus preventing interference between users within a cell.

However, there is a problem in that the number of users, which can be accommodated within a single cell, is limited by the number of orthogonal codes that can be generated because the number of orthogonal codes that can be made to have the sequence of a limited length is limited.

This problem may be solved using a method of assigning quasi-orthogonal codes to excess users when the number of users within a cell exceeds the number of orthogonal codes that can be generated. However, as described above, the method of using the quasi-orthogonal codes partially does not become an appropriate solution when the activity of a channel is low. In case where a user equipment is connected to a base station, but the ratio of the time taken to use a channel for data transmission is less, there is a low probability that channels of user equipments using orthogonal codes can be activated at the same time. User equipments transmit data at the same time using quasi-orthogonal codes in which a complete orthogonality is not maintained. Thus, not only complete orthogonal code resources are used inefficiently, but also an effect of prohibiting intra-cell interference may be degraded.

IEEE (Institute of Electrical and Electronics Engineers) 802.16 standard provides technologies and protocols for supporting broadband wireless access. IEEE 802.16-2004/Cor1 of the IEEE 802.16-2004 standard, which was authorized in 2004, was completed in the form of "corrigendum" in order to modify bugs and error in 2005. The IEEE 802.16-2004 standard adopts a solution in which uplink wireless communication resources, used by a user equipment for transmission of data to a base station, are scheduled grossly in order to prevent intra-cell interference.

However, a significant signaling overhead is required in order for the base station to grossly schedule wireless communication resources for each user equipment. This is because a considerable amount of signaling is needed in order to allocate and release resources for each user within a cell. In particular, when user distributions within a cell are frequently changed or there are a lot of users to be accommodated within a single cell, a signaling cycle is too long, which may make its implementation substantially difficult.

DISCLOSURE OF INVENTION

Technical Problem

A an object of the present invention is to provide a multiple access method, which enables easy implementation while minimizing intra-cell interference occurring between user equipments by efficiently using limited wireless communication resources.

Another object of the present invention is to provide a method of preventing a reduction in the performance of a system due to intra-cell interference and maximizing the subscriber capacity of a cell.

Still another object of the present invention is to provide a method of reducing signaling overhead and mitigating the delay of data transmission by removing completely or partially a scheduling process of wireless communication resources for prohibiting intra-cell interference.

Still another object of the present invention is to provide a method of providing a flexible service to a group of complex users having a variety of service quality requirements.

Still another object of the present invention is to provide a method of realizing efficient management of wireless communication resources by combining and using different kinds of orthogonal wireless communication resources, or binding a plurality of contiguous wireless communication resources to groups and transmitting data while hopping every group.

Still another object of the present invention is to provide a method of decoding respective data symbols, transmitted from different transmitters at the same time, when collision is detected between different hopping patterns.

Technical Solution

In one aspect, there is provided a method in which a first communication station receives data through orthogonal resources, while hopping between the orthogonal resources, from a plurality of second communication stations located within a cell region provided by the first communication station. The method includes sensing hopping pattern collision with respect to whether or not at least two different second communication stations transmit the data at the same time using the same orthogonal resources and when the hopping pattern collision is sensed, detecting data transmitted from the second communication stations whose hopping patterns have been collided against each other based on wireless channel characteristics estimated with respect to the collided second communication stations.

In another aspect, there is provided a method in which a second communication station located within a cell region provided by a first communication station transmits data. The method includes generating a hopping pattern between a plurality of orthogonal resources by arranging the plurality of orthogonal resources according to time, generating a transmission signal by mapping a data symbol to orthogonal resources, which are included in the hopping pattern and allocated to a specific timeslot and transmitting the transmission signal to the first communication station.

In still another aspect, there is provided a communication method of allowing multiple accesses to a first communication station from each of a plurality of second communication stations located within a cell region provided by the first communication station. The communication method includes assigning a hopping pattern, which is generated by arranging a plurality of orthogonal resources according to time, to each of the plurality of second communication stations and receiving a data symbol mapped to the orthogonal resources included in the hopping pattern from a second communication station.

In still another aspect, there is provided a communication method of allowing multiple accesses to a first communication station from each of a plurality of second communication stations located within a cell region provided by the first communication station. The communication method includes dividing the plurality of second communication stations into a plurality of service groups according to service quality criteria and allowing a second communication station, included in a first service group, to gain multiple access through scheduling of uplink resources, and a second communication station, included in a second service group, to gain multiple access in such a manner that the second communication station maps a data symbol to a plurality of orthogonal resources while hopping between the orthogonal resources and transmits the data symbol to the first communication station.

In still another aspect, there is provided a receiver for receiving data from each of a plurality of second communication stations, the data being transmitted while hopping between a plurality of orthogonal resources. The receiver includes a channel estimation unit for estimating a characteristic of a wireless channel associated with each of the plurality of second communication stations, a hopping pattern detection unit for detecting a hopping pattern between the plurality of orthogonal resources respectively used for data transmission of the plurality of second communication stations, a collision detection unit for detecting hopping pattern collision between at least two of the plurality of second communication stations and a symbol detection unit for detecting data symbols transmitted from collided second communication stations by reference to the estimated wireless channel characteristic if hopping pattern collision is sensed.

In still another aspect, there is provided a transmitter including a hopping pattern generating unit for generating a hopping pattern between a plurality of orthogonal resources by arranging the plurality of orthogonal resources according to time, a symbol mapping unit for generating a transmission signal by mapping a data symbol to orthogonal resources, which are included in the hopping pattern and allocated to a specific timeslot and a wireless transmit unit for transmitting the generated transmission signal.

Advantageous Effects

Limited wireless communication resources can be used efficiently, and an implementation is easy while minimizing intra-cell interference occurring between users. A reduction in the performance of a system due to intra-cell interference can be prevented and the subscriber capacity of a cell can be maximized.

A scheduling process of orthogonal resources for prohibiting intra-cell interference can be removed completely or partially. Thus, signaling overhead can be reduced and delay of data transmission can be mitigated.

If users are divided into a plurality of groups according to service quality criteria, scheduling-based multi-access is allowed for one group, and non-scheduling-based multi-access is allowed for the other group, a flexible service can be provided to a complex user group with various service quality requirements.

Different kinds of orthogonal resources are combined and used or a plurality of contiguous orthogonal resources are bound into groups and data are transmitted while hopping on a group basis. Accordingly, pilot overhead can be reduced.

BRIEF DESCRIPTION OF THE DRAWINGS

FIG. 1 is a view schematically illustrating the configuration of a wireless communication system according to an embodiment of the present invention.

FIG. 2 is a view illustrating orthogonal code hopping patterns according to the present invention.

FIG. 3 is a flowchart illustrating a data transmission method according to an embodiment of the present invention.

FIG. 4 illustrates the configuration of an orthogonal resource block according to an embodiment of the present invention.

FIG. 5 is a view illustrating a process in which a second communication station controls a signal transmission time in order to temporally synchronize a signal received from a first communication station.

FIG. 6 is a flowchart illustrating a data transmission method according to an embodiment of the present invention.

FIGS. 7 and 8 illustrate constellations of received data signals when a collision station has compensated for the phase and amount (transmission power) of a transmission signal by reference to the phase and amount of a wireless channel estimation value.

FIG. 9 illustrates a signal constellation when a second communication station has compensated for only the amount (transmission power) of a transmission signal without compensating for the phase of the transmission signal and then sent the transmission signal.

FIG. 10 is a view illustrating a received data signal and a constellation when a second communication station has not controlled power or phase.

FIG. 11 is a flowchart illustrating a data transmission method according to still another embodiment of the present invention.

FIG. 12 illustrates the structure of a transmitter that transmits data symbols according to a hopping pattern using orthogonal frequency resources as a basic unit.

FIG. 13 illustrates the structure of a transmitter that transmits data symbols while hopping between a plurality of orthogonal code resources.

FIG. 14 illustrates the structure of a transmitter that transmits data symbols while hopping between a plurality of orthogonal time resources.

FIG. 15 is a view illustrating a receiver in case where a hopping pattern is configured using orthogonal frequency resources.

MODE FOR THE INVENTION

FIG. 1 is a view schematically illustrating the configuration of a wireless communication system according to an embodiment of the present invention.

Referring to FIG. 1, a wireless communication system includes a plurality of second communication stations 121, 122 and 123 equipped with a mobility and wireless communication function, and a first communication station 110 which provides the second communication stations 121, 122 and 123 with a specific range of a cell region and communicates with the second communication stations 121, 122 and 123 located within the cell region.

The first communication station 110 may be called a Base Station (BS) and may also be called a Radio Access Station (RAS) in a portable Internet system and an Access Point (AP) in a Wireless Local Area Network (WLAN) system. The first communication station 110 may include various kinds of communication equipments for providing a wireless communication region (cell region) to the second communication stations 121, 122 and 123 with mobility.

The second communication stations 121, 122 and 123 are also called User Equipments (UEs), and refer to various terminal devices having mobility, which are located within a wireless communication region (cell region) provided by the base station 110. The second communication stations 121, 122 and 123 may also be called a Mobile Station (MS), a mobile communication terminal, a Portable Subscriber Station (PSS) or the like depending on the type of a wireless communication system.

The first communication station 110 permits multiple accesses by the second communication stations 121, 122 and 123 in order to provide a wireless communication service to the plurality of second communication stations 121, 122 and 123. Each of the plurality of second communication stations 121, 122 and 123 transmits data while hopping between a plurality of wireless communication resources (hereinafter, referred to as an 'orthogonal resource'), which are arranged in a specific pattern according to time.

FIG. 2 illustrates hopping patterns employing orthogonal codes, which are examples of the orthogonal resource.

Second communication stations 201 to 206 are assigned different hopping patterns 211 to 216, respectively. Each of the hopping patterns 211 to 216 includes a plurality of orthogonal codes allocated according to a timeslot unit having a length Ts. For example, a seventh orthogonal code "OC#7" may be allocated to a (n+2)th timeslot 221 of the second communication station 201, and an eleventh orthogonal code "OC#11" may be allocated to a (n+4)th timeslot 222 of the second communication station 202. Each of the second communication stations 201 to 206 transmits a data symbol to the first communication station by employing an orthogonal code allocated to each timeslot while hopping between the plurality of orthogonal codes arranged every timeslot as described above.

For reference, the term "hopping" between orthogonal codes refers to a process of switching an orthogonal code used to transmit a data symbol to different orthogonal codes, included in a hopping pattern, every timeslot instead of transmitting a plurality of data symbols continuously using one orthogonal code allocated fixedly. The meaning of "hopping" is also applied to hopping between various kinds of orthogonal resources, such as orthogonal frequency resources and orthogonal time resources to be described later on.

Orthogonality is guaranteed between different orthogonal codes. Thus, the first communication station can detect data symbols, which are transmitted at the same time from the second communication stations 201 to 206, respectively, using different orthogonal codes. However, for example, it is assumed that the eleventh orthogonal code "OC#11" is commonly allocated to the (n+2)th timeslot 221 included in the hopping pattern of the second communication station 203 and the second communication station 205, and the seventh orthogonal code "OC#7" is allocated to each of (n+4)th timeslots 222 included in the hopping patterns of the second communication station 205 and the second communication station 206. In case where two different second communication stations 203, 205 transmit data symbols by employing the same orthogonal code at the same timeslot, the first communication station cannot detect received data symbols. This situation is called hopping pattern collision. The second communication stations in which collision has occurred (that is, the second communication station 203 and the second communication station 205 at the (n+2)th timeslot 221 and the second communication station 205 and the second communication station 206 at the (n+4)th timeslot 222) are referred to as "collision stations".

Hopping pattern collision is generated between the second communication stations 201, 203, 205, 206 (which are indicated by a solid line), which are transmitting data actually (that is, in an active state), but is not generated in the second communication stations 202, 204 (which are indicated by a dotted line), which are connected to the first communication station, but are not activated for data transmission. For example, a twelfth orthogonal code "OC#12" is commonly allocated to the hopping patterns of the second communication station 204 and the second communication station 205 at a (n+3)th timeslot, but the second communication station 204 is not activated for data transmission (that is, in an inactive state), so the first communication station can detect a data symbol transmitted from the second communication station 205 without collision. This is true of the second communication station 201 and the second communication station 202, which commonly employ a fourteenth orthogonal code "OC#14" at a (n+6)th timeslot.

Therefore, the first communication station has to first check the activation state of each of the second communication stations 201 to 206 in order to detect data symbols at a specific timeslot. The first communication station detects the hopping patterns 211 to 216, corresponding to the respective second communication stations 201 to 206, and then senses hopping pattern collision based on the activation state information and the detected hopping pattern generation information. If collision is sensed, the first communication station detects data symbols transmitted from collision stations, respectively, using an additional method. The data receiving method of the first communication station is described in more detail later on.

The orthogonal code of FIG. 2 is a code sequence having orthogonality, which is generally used in a bandpass spreading system, etc. Representative code sequences may include Walsh code, Pseudo-Noise (PN) code, and so on. Meanwhile, as an example of the orthogonal resource, a case where the orthogonal codes are employed has been described with reference to FIG. 2. However, the hopping pattern of the present invention can be configured by arranging orthogonal frequency resources or orthogonal time resources according to time as well as the orthogonal code resources. The term "orthogonal frequency resources" refers to a collection of subcarriers in which mutual orthogonality is guaranteed, which is of a kind, such as that applied to an Orthogonal Frequency Division Multiple Access (OFDMA) system. Further, the orthogonal time resources may include a bitmap, indicating whether a plurality of sub-timeslots, which are formed by further dividing a timeslot, are available. Orthogonality is guaranteed between the bitmaps. For example, there are (+1, +1, +1, +1), (+1, +1, −1, −1), (+1, −1, −1, +1), and (+1, −1, +1, −1).

Hereinafter, a method of transmitting and receiving data using the above orthogonal resource hopping patterns is described from the viewpoints of transmission at the second communication station and reception at the first communication station, respectively.

FIG. 3 is a flowchart illustrating a data transmission method according to an embodiment of the present invention.

Referring to FIG. 3, the second communication station generates an orthogonal resource hopping pattern in S310. The second communication station generates a hopping pattern by arranging a plurality of orthogonal resources, such as orthogonal frequency resources, orthogonal code resources or orthogonal time resources, according to time. Alternatively, the hopping pattern may be generated by combining two or more of various kinds of orthogonal resources.

The second communication station generates a transmission signal by mapping a data symbol to the orthogonal resources, allocated to a specific timeslot of the hopping pattern, in step S320. When orthogonal resources used are orthogonal frequency resources, the symbol mapping process may include a process of mapping a modulation sequence of the data symbol to a subcarrier collection. When orthogonal resources are orthogonal code resources, the symbol mapping process may include a process of spreading the data symbol using an orthogonal code.

The second communication station transmits the transmission signal to the first communication station through an uplink channel in step S330. Only a second communication station that has been activated for data transmission (that is, a second communication station in which a corresponding wireless channel is in an activation state) transmits the transmission signal to the first communication station.

In an embodiment, a hopping pattern may be generated by randomly arranging a plurality of orthogonal resources according to time. The second communication station can arrange a plurality of orthogonal resources randomly according to a random sequence using a random sequence generator. In the case where a hopping pattern generation process is simple since an additional signaling is not required from the first communication station, and the amount of orthogonal resources is not sufficient when compared with the number of second communication stations that access the first communication station at the same time, a probability that different second communication stations may use the same orthogonal resources at the same time is not high, so this is not a significant problem.

In another embodiment, the second communication station may receive hopping pattern generation information from the first communication station. The hopping pattern generation information may be an identification number associated with the first communication station and/or the second communication station. The second communication station generates a hopping pattern to be used for data transmission based on received hopping pattern generation information. A method of generating a hopping pattern may include a method of generating a hopping pattern by inputting the hopping pattern generation information as seed information of a hopping pattern generator, a method of reading a pertinent hopping pattern from memory built in each second communication station using the hopping pattern generation information as index information, and the like.

If hopping pattern generating means included in the second communication station is also included in the first communication station, the first communication station can generate a hopping pattern corresponding to each second communication station using hopping pattern generation information assigned to the second communication station in the same manner. Thus, a hopping pattern detection process in the first communication station can be simplified. This is described later on.

In further another embodiment, a hopping pattern may be generated by grouping a plurality of orthogonal resources among contiguous orthogonal resources to generate a plurality of orthogonal resource blocks and then arranging the generated orthogonal resource blocks according to time. In this case, the hopping pattern can be configured every orthogonal resource block in which contiguous resources are grouped and prepared instead of configuring a hopping pattern every orthogonal code, orthogonal subcarrier collection or orthogonal sub-timeslot bitmap unit.

FIG. 4 illustrates the configuration of an orthogonal resource block according to an embodiment of the present invention.

Referring to FIG. 4, an orthogonal resource block (that is, the basic unit of hopping) is comprised of 12 contiguous subcarriers along the frequency axis and 5 contiguous OFDM symbols along the time axis. Four contiguous subcarriers are allocated to respective corners of the orthogonal resource block for pilot symbols.

Maximum four-second communication stations may be allocated to one orthogonal resource block. In other words, assuming that there are four second communication stations a, b, c, and d, the second communication station a maps a pilot symbol to a resource 401 at the leftmost side of the orthogonal resource block. In a similar manner, the remaining three second communication stations b, c, and d map pilot symbols to resources 402, 403, and 404 of the orthogonal resource block, respectively. As described above, the orthogonal resource block can accommodate pilot symbols for maximum four-second communication stations without interference.

The pilot symbols are used for channel estimation in a first communication station. If contiguous orthogonal resources are grouped to configure a hopping pattern as an orthogonal resource block unit and only part of the orthogonal resources included in the orthogonal resource block are allocated to pilot symbols, a considerable amount of signaling necessary for transmission of pilot symbols, apart from transmission of data symbols, can be reduced, so that pilot overhead can be reduced and a data transmission process can be simplified. This method of generating an orthogonal resources hopping pattern of an orthogonal resource block unit employs a characteristic in which the estimation performance of a wireless channel corresponding to each orthogonal resource is not degraded greatly although pilot symbols are mapped to only part of orthogonal resources included in an orthogonal resource block because a channel characteristic between contiguous orthogonal resources is similar.

The second communication station can receive an estimation value of a wireless channel from the first communication station and compensate for a transmission signal in terms of phase and/or amount based on the received wireless channel estimation value.

The compensation method of the transmission signal is illustrated below in more detail. The second communication station can perform power control such that receiving power of the transmission signal at the first communication station when it is received from the second communication station becomes constant irrespective of the second communication station. Alternatively, the second communication station can control the phase of the transmission signal so that the first communication station receives the transmission signal of the second communication station as a signal of a constant phase. Unlike the above, the second communication station can control the power and phase of the transmission signal at the same time so that the first communication station receives the transmission signal of the second communication station as a signal having a constant power and phase irrespective of the second communication station. A detailed method in which the first communication station receives a transmission signal, which has been compensated for in terms of phase and/or amount (power) in different forms and sent as described above, and detects data symbols is described in more detail later on.

In order for the first communication station to sense hopping pattern collision, the second communication station can synchronize timeslots included in a hopping pattern temporally. In order to perform synchronization, the second communication station measures a receiving time delay amount of a signal transmitted from the first communication station and calculates a transmission time offset based on the measured receiving time delay amount. In this case, the transmission signal may be transmitted to the first communication station as early as the transmission time offset.

FIG. 5 is a view illustrating a process in which the second communication station controls a signal transmission time in order to temporally synchronize a signal received from the first communication station.

Referring to FIG. 5, second communication stations 501, 502 and 503 receive frames 541, 542, and 543 with time delays 511, 512 and 513, respectively, from a first communication station at a time 571.

The second communication stations 501, 502 and 503 measure the amounts of the time delays 511, 512 and 513 and calculate transmission time offsets 521, 522 and 523, corresponding to the amounts of the time delay, based on the measured amounts of the time delays. The transmission time offsets 521, 522 and 523 are calculated with reference to a correlation of a downlink channel 561 and an uplink channel 562, and they reflect time delay, which is expected when transmitting frames 551, 552 and 553 from the second communication stations 501, 502 and 503 to the first communication station.

The second communication stations 501, 502 and 503 decide transmission timings of the frames 551, 552 and 553, respectively, in consideration of the calculated transmission time offsets 521, 522 and 523 and times taken to transmit the frames 551, 552 and 553 themselves. Thus, the frames 551, 552 and 553, which are transmitted from the respective second communication stations 501, 502 and 503 at times 531, 532 and 533, are received at the same time by the first communication station at a time 572.

There may be some error in the time 572 at which the frames 551, 552 and 553 are received at the first communication station due to time variation in a channel characteristic of the uplink 562 or error in calculation of the transmission time offsets 521, 522 and 523. However, if the amount of error does not reach the length of a cyclic prefix period, it may be considered that the frames 551, 552 and 553 are received normally.

Signals transmitted from respective second communication stations with different time delays can be controlled so that they are received at the first communication station at the same time by controlling signal transmission times at the second communication stations. Through this, hopping patterns respectively corresponding to a plurality of second communication stations are temporally synchronized at a first communication station.

FIG. 6 is a flowchart illustrating a data transmission method according to an embodiment of the present invention. The flowchart of FIG. 6 is performed by the first communication station.

In step S610, the first communication station detects orthogonal resources hopping pattern used by a second communication station for data transmission.

In an embodiment, the first communication station can detect a hopping pattern by receiving additional information related to the hopping pattern from the second communication station.

In another embodiment, the first communication station can detect hopping patterns corresponding to respective second communication stations in such a manner that it generates hopping patterns respectively corresponding to a plurality of second communication stations, allocating the generated hopping patterns to the second communication stations, and refers to the generation and allocation information. The first communication station first combines a plurality of orthogonal resources in order to generate a plurality of hopping patterns, and allocates the generated hopping patterns to a plurality of second communication stations. For example, the first communication station can generate a hopping pattern by randomly selecting a plurality of orthogonal resources and arranging the selected orthogonal resources according to time.

Alternatively, it is assumed that a hopping pattern generated by combining a plurality of orthogonal resources is called a "non-collision hopping pattern" so that hopping pattern collision is not generated mutually. When a total number of second communication stations is smaller than a total number of non-collision hopping patterns that can be generated from a limited amount of orthogonal resources, respective non-collision hopping patterns can be allocated to the second communication stations. Meanwhile, when a total number of second communication stations is larger than a total number of non-collision hopping patterns that can be generated from a limited amount of orthogonal resources, hopping patterns, which are generated by randomly combining a plurality of orthogonal resources, can be allocated to second communication stations corresponding to excess second communication stations.

Alternatively, the first communication station can generate a specific number of hopping patterns, and bind the generated hopping patterns among non-collision hopping patterns in which hopping pattern collision is not generated mutually in order to generate a plurality of non-collision groups. Hopping patterns belonging to a plurality of non-collision groups can be selected one by one and then allocated to second communication stations. A total number of generated hopping patterns can be the same as or less than a maximum number of second communication stations, in which a first communication station can accommodate multiple accesses.

In step S620, the first communication station determines whether an uplink channel corresponding to the second communication station has been activated. Whether an uplink channel corresponding to the second communication station has been activated can be determined based on whether a pilot signal has been received from the second communication station, the energy measurement result of a wireless channel corresponding to the second communication station, and so on. If a pilot signal is received or an energy measurement value of a wireless channel exceeds a noise level, it is determined that a wireless channel corresponding to a pertinent second communication station is in an activation state.

In step S630, if it is determined that the same orthogonal resources are allocated to a specific timeslot included in at least two of a plurality of detected hopping patterns and wireless channels of second communication stations respectively corresponding to the at least two hopping patterns are all activated, the first communication station determines that hopping pattern collision has occurred between the corresponding second communication stations. If wireless channels are activated at the same time for data transmission even in the case of hopping patterns to which the same orthogonal resources are allocated at the same timeslot, the first communication station detects data symbols only through activated wireless channels. Thus, it is determined that hopping pattern collision has not occurred. As mentioned above, at least two second communication stations, which correspond to the at least two hopping patterns and have generated hopping pattern collision, are referred to as "collision stations".

If hopping pattern collision is not sensed, the first communication station can detect respective data symbols using orthogonal resources on hopping patterns respectively corresponding to a plurality of second communication stations. However, if hopping pattern collision is sensed, there is a need for an additional detection method of detecting data symbols received at the same time through the same orthogonal resources, respectively.

Steps S640 to S660 correspond to steps of detecting data symbols with reference to an uplink channel characteristic associated with each second communication station when hopping pattern collision is sensed.

Though not shown in FIG. 6, the first communication station receives signals at the same time on which data symbols are respectively loaded by collision stations. Hereinafter, signals received from collision stations at the same time are referred to as "data signals" as described above. Further, though not shown in FIG. 6, the first communication station estimates the characteristic of an uplink channel, associated with a corresponding second communication station, through a pilot symbol received from each second communication station.

In step S640, the first communication station forms a signal constellation with respect to a collision station by reference to an estimated wireless channel characteristic. In step S650, the first communication station decodes data symbols, transmitted from respective second communication stations, based on coordinates on the constellation of the data signals.

In step S660, the first communication station decodes the data symbols transmitted from the second communication stations in which hopping pattern collision has not occurred separately from the data symbols transmitted from the collision stations. Step S660 is not limited to the sequence shown in FIG. 6, and may be executed simultaneously with steps S640 and S650 or anterior to steps S640 and S650.

The constellation formed in step S640 may have a variety of shapes depending on whether a second communication station has performed compensation by reference to a characteristic estimation value of a wireless channel and a compensation method. The characteristic of a wireless channel can be acquired in the second communication station in such a manner that it is estimated in the first communication station and information thereof is then transferred to the second communication station, or the second communication station estimates the characteristic of a downlink wireless channel and then estimates the characteristic of an uplink channel.

Steps S640 to S660 can also performed when hopping pattern collision between collision stations is sensed in step S630. Meanwhile, in case where hopping pattern collision is not sensed with respect to any second communication stations, data symbols respectively transmitted from second communication stations are decoded in step S670. In step S670, the decoding of the respective data symbols can be performed sequentially or grossly.

FIGS. 7 and 8 illustrate constellations of received data signals when a collision station has compensated for the phase and amount (transmission power) of a transmission signal by reference to the phase and amount of a wireless channel estimation value.

FIG. 7 illustrates an example in which hopping pattern collision has occurred between two second communication stations. It is assumed that a used modulation method is Binary Phase Shift Keying (BPSK). In the case of Quadrature Phase Shift Keying (QPSK), BPSK can be configured in parallel on the in-phase axis and the quadrature phase axis. Data symbol coordinates 711, 712 indicate coordinates of symbols that would have been independently received from collision station when collision was not generated. Since the phase and amount of a transmission signal are compensated for and then sent from each second communication station, each data symbol is received as a signal having the same phase and the same amount. Positions of data symbols '+1' and '−1' are illustrated on the data symbol coordinates 711, 712.

A constellation 720 indicates the shape of a data signal received from the first communication station when hopping pattern collision has occurred. If data symbols of '+1' are transmitted from two collision stations, data signals received at the first communication station are located at '+2', which is the sum of the two data symbols.

Meanwhile, when two collision stations transmit '−1', the data signals received at the first communication station are located at a '−2' coordinate on the constellation 720. In a similar way, when one collision station transmits '−1' and the other collision station transmits '+1', the data signals received at the first communication station are located at a '0' coordinate on the constellation 720.

According to an embodiment, when the size of a received data signal is smaller than a specific critical value, the first communication station replaces the data signal with a value '0' and then decodes the data signal. For example, in case where the data signal 721 that has really been received from the first communication station is placed near '0' as if it is displayed on the constellation 720, the data signal 721 can be nulled, replaced with '0', and then input to the decoder, instead of directly inputting the received data signal 721 to the decoder.

If data signals, which are received when different collision stations transmit different data symbols, are directly input to the decoder, only noise introduced in the transmission process is input to the decoder and, therefore, the performance can be degraded when compared with that a signal of an intermediate '0' value is input. Accordingly, if the data signal 721 placed near '0' is replaced with '0' and then decoded, there is an advantage in that the influence by noise can be removed. The critical value, which is a basis for determining whether the data signal 721 is placed near '0' on the constellation, can be obtained by applying, for example, a maximum posterior probability estimation scheme to the data signal 721.

In accordance with another embodiment, the first communication station detects a data symbol based on a likelihood metric calculation result, such as Log Likelihood Ratio (LLR), on the basis of coordinates on the constellation 720 of received data signals. For example, if the received data signal 722 is placed near '+2', the first communication station can estimate that data symbols of the '+1' value were transmitted from two collision stations by reference to the amount or symbol of a likelihood metric calculation result such as LLR. When two collision stations exist as shown in FIG. 7, the LLR calculation equation with respect to a data symbol $S_1$ transmitted from one of the two collision stations can be expressed in the following $$LLR(S_1) = \log \frac{P(r | S_1 = +1, S_2 = +1) + P(r | S_1 = +1, S_2 = -1)}{P(r | S_1 = -1, S_2 = -1) + P(r | S_1 = -1, S_2 = +1)} \quad \text{MathFigure 1}$$

$$= \log \frac{\exp\left\{-\frac{(r-2)^2}{2\sigma^2}\right\} + \exp\left\{-\frac{r^2}{2\sigma^2}\right\}}{\exp\left\{-\frac{(r+2)^2}{2\sigma^2}\right\} + \exp\left\{-\frac{r^2}{2\sigma^2}\right\}}$$

where r indicates a received data signal from a collision station, and $\sigma^2$ indicates noise power of a first communication station (that is, a receiving terminal).

From Equation 1, when the sign of $LLR(S_1)$ is a positive number, the value of the data symbol $S_1$ is estimated as '+1' and when the sign of $LLR(S_1)$ is a negative number, the value of the data symbol $S_1$ is estimated as '−1'. However, in case where the log of the calculation result is not taken, when the value of the calculation result exceeds 1, the value of $S_1$ can be estimated as '+1', and when the value of the calculation result is less than 1, the value of $S_1$ can be estimated as '−+1'.

A method similar as that using Equation 1 is applied to calculate LLR with respect to a data symbol $S_2$ transmitted from the other of the two collision stations, and description thereof is not given.

FIG. 8 illustrates a signal constellation at the first communication station (that is, a receiver) when data symbols are respectively transmitted from three collision stations. Data symbol coordinates 811 to 813 indicate positions of symbols when data symbols transmitted from second communication stations, respectively, are independently received at the first communication station. It is assumed that a used modulation method is BPSK in the same manner as the case of FIG. 7.

A constellation 820 shows a constellation when the above data symbols are transmitted at the same time through the same orthogonal resources due to hopping pattern collision. A coordinate on the constellation 820 of received data signals corresponding to when all the three collision stations transmit symbols of '+1' is '+3', and a coordinate on the constellation 820 of received data signals corresponding to when all the three collision stations transmit symbols of '−1' is '−3'. A coordinate on the constellation 820 of received data signals corresponding to when two of the three collision stations transmit symbols of '+1' and the remaining one of the three collision stations transmits a symbol of '−1' is '+1', and a coordinate on the constellation 820 of received data signals corresponding to when two of the three collision stations transmit symbols of '−1' and the remaining one of the three collision stations transmits a symbol of '+1' is '−1'.

Even in the case of FIG. 8, in a similar manner to that of FIG. 7, the data symbols received from the respective collision stations can be decoded using a likelihood metric calculation result, such as LLR. Further, even when hopping pattern collision has occurred between four or more collision stations, the formation of a constellation and a decoding process of data symbols are similar to the above.

FIG. 9 illustrates a signal constellation when a second communication station has compensated for only the amount (transmission power) of a transmission signal without compensating for the phase of the transmission signal and then sent the transmission signal. It is assumed that a used modulation method is BPSK. In the case of QPSK, BPSK can be configured in parallel on the sine axis and the cosine axis. Two data symbol coordinates 911, 912 indicate positions of received data symbols from second communication stations whose received phase angles are θ1, θ2, respectively. Receive powers from the second communication stations are identical to each other due to power control. In FIG. 9, it is assumed that the amount of the received signal is '1'.

If collision occurs between the second communication stations, a data signal received from the first communication station has a shape in which the two data symbol coordinates 911, 912 are added as a symbol coordinate. A constellation 920 of received data signals upon collision is shown in FIG. 9.

In the case of FIG. 7, if a data symbol near '0' is received, it is difficult to determine from which '+1' or '−1' has been received from any one of second communication stations based on only the coordinates of received signals. However, in the case of FIG. 9, since coordinates on the constellation 920 differ from each other in the case of $(S_1, S_2)=(+1, -1)$ 921 and in the case of $(-1, +1)$ 922, values of data symbols transmitted from the respective second communication stations can be estimated accurately based on the coordinates of the data signals.

Even in the case where the phase of a transmission signal is not compensated for as in FIG. 9, when data signals are placed near $(S_1, S_2)=(+1, -1)$ or $(-1, +1)$, the data signals can be nulled, replaced with a '0' value, and then input to the decoder. Further, a likelihood metric value, such as LLR calculated based on the coordinates on the constellation 920 of the received data signals, can be used as the input of the decoder. In this case, a LLR calculation equation of the data symbol $S_1$ can be expressed into the following $$LLR(S_1) = \log \frac{P(r|S_1=+1, S_2=+1) + P(r|S_1=+1, S_2=-1)}{P(r|S_1=-1, S_2=-1) + P(r|S_1=-1, S_2=+1)}$$

$$= \log \frac{\exp\left\{-\frac{|r - e^{-j\theta_1} - e^{-j\theta_2}|^2}{2\sigma^2}\right\} + \exp\left\{-\frac{|r - e^{-j\theta_1} + e^{-j\theta_2}|^2}{2\sigma^2}\right\}}{\exp\left\{-\frac{|r + e^{-j\theta_1} + e^{-j\theta_2}|^2}{2\sigma^2}\right\} + \exp\left\{-\frac{|r + e^{-j\theta_1} - e^{-j\theta_2}|^2}{2\sigma^2}\right\}}$$

MathFigure 2 where r indicates a received data signal from a collision station, and $\sigma^2$ indicates noise power of a first communication station (that is, a receiving terminal).

A method of estimating the value of a data symbol using the amount or sign of a likelihood metric calculation result is the same as that described with reference to the Equation 1.

FIG. 10 is a view illustrating received data signals and a constellation when a second communication station has not controlled power or phase. It is assumed that a used modulation method is BPSK. Two data symbol coordinates 1011, 1012 indicate positions of received data symbols in which received phase angles are $\theta_1$, $\theta_2$, and the amounts of the received signals are $\alpha_1$, $\alpha_2$, respectively. If hopping pattern collision occurs between the two second communication stations having the above symbol coordinates 1011, 1012, the two symbol coordinates are added, resulting in the form of one symbol on a constellation 1020.

Even in this case, in a similar manner as FIG. 9, when the received data signals are placed near '0', the data signals can be nulled, replaced with the '0' value, and then input to the decoder. Alternatively, a likelihood metric value such as LLR with respect to the received signals can be used as the input of the decoder. In this case, a LLR calculation equation of a data symbol $S_1$ can be expressed into the following $$LLR(S_1) = \log \frac{P(r|S_1=+1, S_2=+1) + }{P(r|S_1=-1, S_2=-1) +} \quad \text{MathFigure 3}$$
$$P(r|S_1=+1, S_2=-1)$$
$$P(r|S_1=-1, S_2=+1)$$

$$= \log \frac{\exp\left\{-\frac{|r-\alpha_1 e^{-j\theta_1} - \alpha_2 e^{-j\theta_2}|^2}{2\sigma^2}\right\} + \exp\left\{-\frac{|r-\alpha_1 e^{-j\theta_1} + \alpha_2 e^{-j\theta_2}|^2}{2\sigma^2}\right\}}{\exp\left\{-\frac{|r+\alpha_1 e^{-j\theta_1} + \alpha_2 e^{-j\theta_2}|^2}{2\sigma^2}\right\} + \exp\left\{-\frac{|r+\alpha_1 e^{-j\theta_1} - \alpha_2 e^{-j\theta_2}|^2}{2\sigma^2}\right\}}$$

where r indicates a received data signal from a collision station, and $\sigma^2$ indicates noise power of a first communication station (that is, a receiving terminal).

A method of estimating the value of a data symbol using the amount or sign of a likelihood metric calculation result is the same as that described with reference to the Equation 1.

The data detection method at a first communication station when a second communication station performs compensation of a phase and/or amount based on an uplink channel estimation value has been described so far with reference to FIGS. 7 to 10. A time synchronization process of a data symbol is commonly to the embodiments. That is, respective second communication stations control transmission times of data symbols so that data symbols transmitted from different second communication stations are received at a first communication station at the same time without deviation depending on different time delays. A detailed method of time synchronization performed in a second communication station has already been described above.

FIG. 11 is a flowchart illustrating a data transmission method according to still another embodiment of the present invention. This is an example of steps S640 and S650 of FIG. 6.

The first communication station receives data signals from collision stations, selects any one of the entire collision stations and decodes a data symbol transmitted from the selected collision station in step S1110. The first communication station recodes and remodulates the decoded data symbol in step S1120, and regenerates a data signal corresponding to the decoded data symbol in step 1130.

The regenerated data signal is removed from the entire data signals. Assuming that the entire data signals from which the regenerated data signal has been removed is a second data signal, the second data signal becomes a data signal of a state from which the influence by a data symbol transmitted from a selected collision station, of data symbols transmitted from collision stations, has been removed. Thus, if any one collision station is selected from the collision stations that have not been selected and the above process is repeated on the basis of the second data signal, the data symbol transmitted from the collision stations can be detected sequentially one by one.

If the data symbols are detected repeatedly and sequentially as described above, the accuracy in detecting the data symbols can be increased. That is, a high detection accuracy can be maintained if data symbols are decoded one by one beginning from a collision station, which is the best in a wireless channel state or is estimated to have the most clear value of a received data symbol, of collision stations, the influence by the decoded data symbols is removed, and data symbols from other collision stations are decoded. In particular, when the number of collision stations is many, the above sequential detection method can be very useful. In detecting data symbols transmitted from respective selected collision stations, the contents of the embodiments in which a data signal near '0' is nulled and then input to the decoder or a likelihood metric such as LLR is used may be used without change.

In the embodiment FIG. 11, the repetitive and sequential data symbol process has been applied to collision stations. However, the repetitive and sequential data symbol detection process may be applied to the entire second communication stations that have transmitted the data symbols at the same time.

Orthogonal frequency resources, orthogonal code resources or orthogonal time resources may be used as the basic unit of an orthogonal resource hopping pattern. Further, a hopping pattern may be generated and used using a combination of different resources as a basic unit.

The present invention proposes a new type of a multiple access method of mapping data symbols to a plurality of orthogonal resources while hopping between the orthogonal resources and then transmitting the data symbols to the first communication station, unlike the conventional multiple access method of scheduling wireless resources with respect to a plurality of second communication stations. For convenience' sake, the conventional technology is called a scheduling-based multiple access scheme and the proposed technology is a statistical multiplexing-based orthogonal resource hopping multiple access scheme.

The latter method is advantageous in that a signaling cycle is reduced, the number of second communication stations that enable multiple accesses is increased, etc. compared with the former method. However, if the former and latter methods are combined, service providing efficiency can be maximized.

The service providing quality can be differentiated by dividing a plurality of second communication stations into a plurality of service groups according to service quality criteria, such as latency of a provided service and a data transmission rate, and applying different multiple access schemes to different service groups. For example, if a plurality of second communication stations are divided into two service groups according to the service quality criteria and the scheduling-based multiple access scheme is then applied to second communication stations included in the first service group, data transmission can be guaranteed without collision between the second communication stations belonging to this group. Further, if the orthogonal resource hopping multiple access scheme is applied to second communication stations included in the second service group, limited wireless communication resources can be used efficiently.

Second communication stations requiring a higher level of a service quality can be included in the first service group and second communication stations requiring a relatively low level of a service quality can be included in the second service group. Further, a more flexible and adaptive operation is possible by adaptively changing a service group including respective second communication stations according to the state of an uplink channel associated with the second communication stations.

A proposed transmitter of the second communication station includes a hopping pattern generating unit for arranging a plurality of orthogonal resources according to time and generating a hopping pattern between the plurality of orthogonal resources, a symbol mapping unit for generating a transmission signal by mapping a data symbol to orthogonal resources, which are included in a hopping pattern and allocated to a specific timeslot, and a wireless transmit unit for transmitting the generated transmission signal to the first communication station through a wireless channel.

FIG. 12 illustrates the structure of a transmitter that transmits data symbols according to a hopping pattern using orthogonal frequency resources as a basic unit. This transmitter is a transmitter of an OFDM scheme.

A data symbol to be transmitted is coded at a predetermined code rate through a channel encoder 1211 and then interleaved through an interleaver 1212 in order to remove correlation at a channel. The interleaved data symbol experiences a modulator 1213. The data symbol that has experiences a serial-to-parallel converter 1214 is input to a subcarrier allocator 1220. The subcarrier allocator 1220 maps the data symbol to a subcarrier collection (that is, the basic unit of a hopping pattern generated by an orthogonal frequency hopping pattern generator 1230). The data symbol mapped to the subcarrier collection, as described above, is transformed into a time region signal through an Inverse Fast Fourier Transform (IFFT) module 1215 and then input to a parallel-to-serial converter 1216, so it is converted into the form of a sequential signal. A signal into which a cyclic prefix (CP) period has been inserted through a CP adder 1217 in order to invalidate the influence by delay spreading is converted into an analog signal through a Digital Analog Converter (DAC) 1218 and then transmitted to the first communication station through a wireless channel.

FIG. 13 illustrates the structure of a transmitter that transmits data symbols while hopping between a plurality of orthogonal code resources.

A channel encoder 1311, an interleaver 1312, a modulator 1313, and a D/A converter 1314 have the same construction and operation as the corresponding constituent elements 1211, 1212, 1213, and 1218 of FIG. 12, and detailed description thereof will be omitted. The transmitter of FIG. 13 generates a hopping pattern by arranging a plurality of orthogonal codes according to time through an orthogonal code hopping pattern generator 1330. Respective orthogonal codes constituting the hopping pattern are input to a spreader 1320 in which a data symbol is multiplied by the orthogonal codes in order to spread the data symbol.

FIG. 14 illustrates the structure of a transmitter that transmits data symbols while hopping between a plurality of orthogonal time resources.

A channel encoder 1411, an interleaver 1412, a modulator 1413 and a D/A converter 1414 have the same construction and operation as the corresponding constituent elements 1211, 1212, 1213 and 1218 of FIG. 12, and detailed description thereof will be omitted. A symbol mapper 1420 included in the transmitter of FIG. 14 generates a transmission signal by mapping a data symbol to an orthogonal time hopping pattern, which is generated by an orthogonal time hopping pattern generator 1430. The orthogonal time hopping pattern generator 1430 generates the orthogonal time hopping pattern by arranging bitmaps, indicating whether sub-timeslots have been used, according to time. The symbol mapper 1420 performs symbol mapping through a process of mapping the data symbol to the bitmap allocated to each timeslot.

Each of the hopping pattern generators 1230, 1330, and 1430 included in the transmitters of the respective embodiments can generate a hopping pattern by randomly arranging orthogonal resources. Alternatively, each of the hopping pattern generators 1230, 1330, and 1430 can generate a hopping pattern or read it from memory according to hopping pattern generation information received from a first communication station.

Meanwhile, a scheduler (not shown) for scheduling orthogonal resources, such as orthogonal frequencies, orthogonal codes, and orthogonal time, may be additionally included in the transmitters shown in FIGS. 12 to 14. Each second communication station may be included in an additional service group in which a multiple access is allowed in different manners according to service quality criteria. Scheduling information output by the scheduler may be received from a first communication station or may be directly generated by a second communication station. The scheduling information is input to each of the subcarrier allocator 1220, the spreader 1320, and the symbol mapper 1420. The subcarrier allocator 1220, the spreader 1320, or the symbol mapper 1420 that respectively have received the scheduling information select one of the scheduling information input from the scheduler and the hopping patterns generated by the hopping pattern generator 1230, 1330, and 1430, and map a data symbol. At this time, the selection of the scheduling information and the hopping pattern is performed according to a service group to which the second communication station belongs. In other words, when the service quality criteria is high, the data symbol may be mapped to the orthogonal resources by reference to the scheduling information, but when the service quality criteria is relatively low, the data symbol may be mapped to the orthogonal resources included in the hopping pattern.

A proposed receiver of the first communication station includes a channel estimation unit for estimating a characteristic of a wireless channel associated with each of plurality of second communication stations, a hopping pattern detection unit for detecting a hopping pattern between a plurality of orthogonal resources respectively used for data transmission of a plurality of second communication stations, a collision detection unit for sensing whether hopping pattern collision has occurred between collision stations of a plurality of second communication stations, and a symbol detection unit for detecting data symbols respectively transmitted from collision stations by reference to the wireless channel characteristic estimated when hopping pattern collision is sensed.

In accordance with an embodiment, the symbol detection unit includes a decoder for deciding a wireless signal received from a collision station and detecting a data symbol. When the amount of the wireless signal is smaller than a predetermined critical value, the signal of the '0' value instead of the wireless signal is input to the decoder.

In accordance with another embodiment, the symbol detection unit may include a likelihood metric calculator for forming a constellation with respect to a collision station by reference to an estimated wireless channel characteristic and calculating a likelihood metric of a wireless signal received from the collision station on the basis of the constellation, and a decoder for detecting a data symbol from the wireless signal by reference to the amount or sign of the calculated likelihood metric.

Further, at this time, data signals respectively transmitted from a plurality of second communication stations may be signals whose amount and/or phase have been compensated for. The compensation the amount and/or phase is performed based on an estimated uplink channel characteristic. A channel characteristic estimation value may be obtained by allowing a first communication station to receive a pilot symbol transmitted from a second communication station and then transmitted to each second communication station again, or may be directly estimated based on a downlink channel characteristic estimated in each second communication station.

FIG. 15 is a view illustrating a receiver in case where a hopping pattern is configured using orthogonal frequency resources.

A signal received from a second communication station through a wireless antenna and a radio frequency (RF) handler 1511 is converted into a digital signal through an Analog Digital Converter (ADC) 1512. The signal then has its CP period removed therefrom by a CP remover 1513. The received signal through the CP remover 1513 is transformed into a frequency region signal through a Fast Fourier Transform (FFT) module 1514 and then input to a symbol de-mapper & de-modulator 1521. Further, the symbol de-mapper & de-modulator 1521 receives a hopping pattern generated by an orthogonal frequency hopping pattern generator 1530, performs symbol de-mapping on a subcarrier collection included in the hopping pattern in order to extract a symbol signal, and then de-modulates the symbol signal using a predetermined de-modulation method corresponding to a modulation method at a transmitter. In this case, the symbol de-mapper & de-modulator 1521 separates symbol signals every second communication stations by reference to input hopping patterns.

Symbol signals can be extracted simply through symbol de-mapping and de-modulation with respect to orthogonal resources between second communication stations in which hopping pattern collision has not occurred, but a special process is needed when collision has occurred. Thus, a collision detector & controller 1550 determines whether hopping pattern collision has occurred by reference to a hopping pattern of each second communication station and the second communication stations have been activated. If collision is sensed, the collision detector & controller 1550 performs a control operation for detecting data symbols from respective collision stations. Detection of the data symbols of the collision stations can be performed using a method of inputting the signal of the '0' value instead of a wireless signal, a method of calculating a likelihood metric such as LLR and then inputting a calculated result to the decoder or the like, as mentioned in the above embodiments.

Meanwhile, the collision detector & controller 1550 may use a wireless channel estimation value in order to detect data symbols from collision stations. To this end, a channel estimator 1540 estimates a characteristic of an uplink channel associated with each second communication station based on a pilot symbol received from the second communication station, etc., and transfers estimated characteristics to the collision detector & controller 1550.

A de-interleaver 1522 performs de-interleaving on the data symbols through the collision detector & controller 1550, as an inverse process on interleaving in the transmitter. The de-interleaved data symbols are decoded and then finally detected by a channel decoder 1523.

The functions described in connection with the embodiments disclosed herein may be performed by implemented by hardware, software or a combination thereof. The hardware may be implemented by a microprocessor, a controller, an application specific integrated circuit (ASIC) and a processor. Design, development and implementation of the software are well known to those skilled in the art based on the detailed description.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for a first communication station receiving data through orthogonal resources, while hopping between the orthogonal resources, from a plurality of second communication stations located within a cell region provided by the first communication station, the method comprising:
   determining whether a hopping pattern collision has occurred with respect to whether at least two different second communication stations of the plurality of second communication stations transmit the data at the same time using the same orthogonal resources; and
   detecting data transmitted from the at least two second communication stations whose hopping patterns have collided against each other based on wireless channel characteristics estimated with respect to the collided second communication stations when the hopping pattern collision is sensed,
   wherein detecting the data comprises:
      forming a constellation with respect to data signals received from the at least two collided second communication stations by reference to the estimated wireless channel characteristics; and
      decoding the data from data signals based on coordinates on the constellation of the data signals received from the at least two collided second communication stations, and
   wherein decoding the data comprises:
      calculating a likelihood metric based on the coordinates on the constellation of the data signals; and
      estimating data symbols by reference to a size or a sign of the calculated likelihood metric.

2. The method of claim 1, wherein determining whether the hopping pattern collision has occurred comprises:
   detecting a plurality of hopping patterns corresponding to the plurality of second communication stations;
   determining whether wireless channels corresponding to the plurality of second communication stations have been activated; and
   sensing the hopping pattern collision between the corresponding second communication stations when the same orthogonal resources are allocated to specific timeslots of at least two of the plurality of hopping patterns and wireless channels of second communication stations corresponding to the at least two of the plurality of hopping patterns.

3. The method of claim 1, wherein a data signal of the received data signals is replaced with a '0' value and then decoded when the size of the data signal of the received data signals is smaller than a critical value.

4. The method of claim 1, further comprising:
   generating a plurality of hopping patterns by combining the orthogonal resources and allocating the plurality of generated hopping patterns to the plurality of second communication stations.

5. The method of claim 1, wherein the data transmitted from the at least two second communication stations is synchronized.

6. A receiver for receiving data from each of a plurality of second communication stations, the data transmitted while hopping between a plurality of orthogonal resources, the receiver comprising:
   a channel estimation unit for estimating a characteristic of a wireless channel associated with each of the plurality of second communication stations;

a hopping pattern detection unit for detecting a hopping pattern between the plurality of orthogonal resources used for data transmission by the plurality of second communication stations;

a collision detection unit for detecting a hopping pattern collision between at least two of the plurality of second communication stations; and a symbol detection unit for detecting data symbols transmitted from the at least two second communication stations where hopping patterns have collided by reference to the estimated characteristic associated with each of the corresponding at least two second communication stations of the wireless channel when the hopping pattern collision is sensed, wherein the symbol detection unit includes a likelihood metric calculator for:

forming a constellation with respect to data signals received from the at least two collided second communication stations by reference to the estimated characteristics associated with each of the corresponding at least two second communication stations of the wireless channel;

decoding the data from data signals based on coordinates on the constellation of the data signals received from the at least two collided second communication stations, calculating a likelihood metric based on the coordinates on the constellation of the data signals; and estimating data symbols by reference to a size or a sign of the calculated likelihood metric.

\* \* \* \* \*